United States Patent [19]

Yokoyama et al.

[11] Patent Number: 5,402,324
[45] Date of Patent: Mar. 28, 1995

[54] SURFACE ILLUMINANT DEVICE

[75] Inventors: Kazuaki Yokoyama; Tsuyoshi Ishikawa; Kayoko Watai, all of Kawaguchi, Japan

[73] Assignee: Enplas Corporation, Japan

[21] Appl. No.: 252,881

[22] Filed: Jun. 2, 1994

[30] Foreign Application Priority Data

Jun. 4, 1993 [JP] Japan .................. 5-35182 U

[51] Int. Cl.⁶ ............................ F21V 9/14; F21V 8/00
[52] U.S. Cl. ................................ 362/19; 362/31; 362/339; 359/49; 359/63
[58] Field of Search ............... 362/19, 26, 31, 293, 362/339; 359/42, 49, 63

[56] References Cited

U.S. PATENT DOCUMENTS

| | | | |
|---|---|---|---|
| 4,011,001 | 3/1977 | Moriya | 359/49 |
| 4,017,155 | 4/1977 | Yagi et al. | 359/49 |
| 4,020,336 | 4/1977 | Linder | 362/19 |
| 4,789,224 | 12/1988 | Bougsty | 362/19 |
| 5,064,276 | 11/1991 | Endo et al. | |
| 5,126,882 | 6/1992 | Oe et al. | |
| 5,341,231 | 8/1994 | Yamamoto et al. | 362/31 |

FOREIGN PATENT DOCUMENTS

0212415A1 4/1986 European Pat. Off. .

*Primary Examiner*—Richard R. Cole
*Attorney, Agent, or Firm*—Graham & James

[57] ABSTRACT

A surface illuminate device illuminates a liquid crystal display panel by diffused light produced through a diffusing plate disposed on the front of an illuminant section. A prism sheet having many triangular prisms is disposed on the exit side of the diffusing plate so that the longitudinal direction of each prism is nearly parallel to the plane of polarization of a polarizing plate placed on the prism sheet side of the liquid crystal display panel. Thus, the surface illuminant device can provide bright illumination suitable for the backlight of the liquid crystal display panel.

1 Claim, 2 Drawing Sheets

SURFACE ILLUMINANT DEVICE

BACKGROUND OF THE INVENTION a) Field of the Invention

The present invention relates to a surface illuminant device used for a backlight of a liquid crystal display or the like.

b) Description of the Prior Art

FIG. 1 shows a conventional surface illuminant device using a light transmitter, in which linear light sources 1 are disposed adjacent to the ends of a light transmitter 2, and a diffusing member 3 and a reflecting member a are situated on the front and back of the light transmitter 2, respectively.

In this surface illuminant device, light from the light sources 1 is incident through entrance ends 2a on the light transmitter 2 and transmitted. By forming a rough surface or fine convex and concave parts on the back of the light transmitter 2 to change the orientation of the light reflected from the back and the reflecting member 4, part of the light transmitted through the light transmitter 2 emerges from a surface 2b of the light transmitter 2. The light emerging from the light transmitter 2 passes through the diffusing member 3 and becomes diffused light, which illuminates a liquid crystal display panel 5, for example.

FIG. 2 shows another conventional surface illuminant device, which uses a reflecting member. In this surface illuminant device, the linear light sources 1 are disposed inside a reflecting member 6 of sectional shape such as that shown in the figure, and light emerging directly from the light sources 1 or after being reflected by the reflecting member 6 is incident as diffused light through the diffusing member 3 on the liquid crystal display panel 5, which is illuminated.

The conventional surface illuminant devices mentioned above are designed to provide uniform illumination through the diffusing member 3, no matter whether the light transmitter shown in Fig. 1 is used or the reflecting member in FIG. 2 is used. This brings about divergent light, which fails to enter the liquid crystal display panel 5, and a loss of light, making it difficult to provide bright illumination. In particular, the light incident on the liquid crystal display panel 5 is diffused light following all directions, and when an observer makes observations, for example, from a direction perpendicular to the liquid crystal display panel, some of the light does not enter his eye and thus a bright image can not be observed.

In order to eliminate these defects, an arrangement is known in which a prism sheet 7 having a prism surface with prisms 7a arranged as shown in FIG. 3 is situated between the diffusing member 3 and the liquid crystal panel 5, and the diffused light from the diffusing member 3 is directed as normal to the liquid crystal display panel 5 as possible, thereby allowing a bright image to be viewed.

Where the prism sheet 7 shown in FIG. 3, as mentioned above, is disposed in front of the surface illuminant device and the liquid crystal display panel 5 is illuminated through the prism sheet, brightness varies with orientation of the longitudinal direction of each prism 7a of the prism sheet 7, and therefore the direction of its ridge line. Thus, only relatively dark illumination is sometimes obtained.

SUMMARY OF THE INVENTION

It is, therefore, an object of the present invention to provide a surface illuminant device, used as the backlight of a liquid crystal display panel, capable of bringing about bright illumination by disposing the prism sheet on the exit side of the diffusing member, namely by setting the orientation of the longitudinal direction of the prism within a particular requirement fulfilled by a relation with the liquid crystal display panel.

The surface illuminant device according to the present invention is adapted to illuminate the liquid crystal display panel after light from a light source section is changed to diffused light through the diffusing member and passes through the prism sheet. The longitudinal direction of each prism of the prism sheet is nearly parallel to the plane of polarization of a polarizing plate situated on the illuminant device side (prism sheet side) of the liquid crystal display panel. Whereby, brightness of the liquid crystal display panel is prevented from reducing.

In the present invention, as the result of repeated experiments for solving the above problem that the brightness varies according to the state of the placement of the prism sheet, that is, the inclination of the longitudinal direction of each prism, it has been noticed that the brightness varies with the relationship between the longitudinal direction of each prism and the planes of polarization of polarizing plates used for the liquid crystal display panel. Consequently, it has been found that the most satisfactory brightness is secured when the longitudinal direction of each prism is nearly parallel to the plane of polarization of a polarizing plate on the prism sheet side, of the polarizing plates used for the liquid crystal display panel.

This and other object as well as the feature and advantages of the present invention will become apparent from the following detailed description of the preferred embodiment when taken in conjunction with the accompanying drawings.

DETAILED DESCRIPTION OF THE PREFERRED EMBODIMENT

Figure 4:
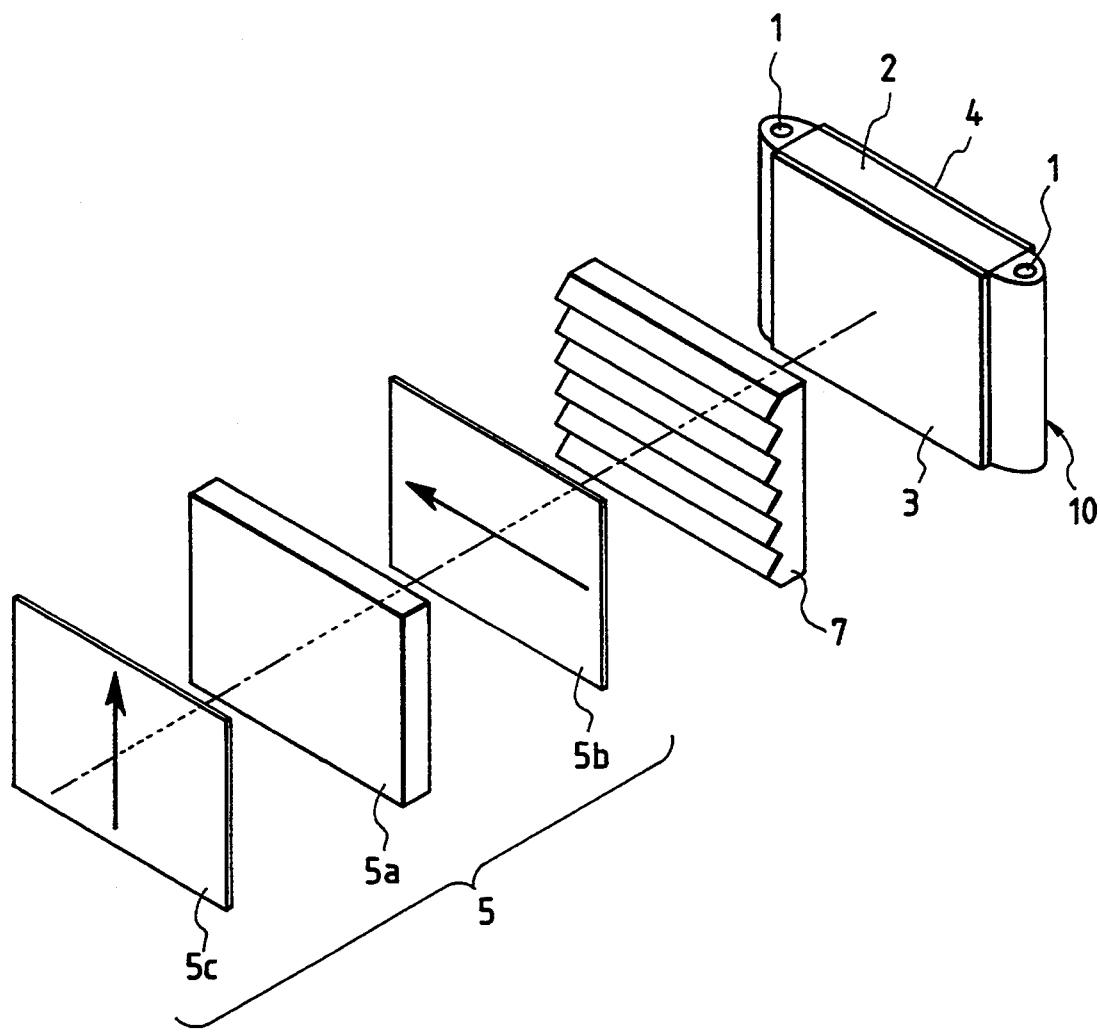
Fig. 4 is a view showing an arrangement of an embodiment of a surface illuminant device according to the present invention.

In accordance with the drawings, the embodiment of the surface illuminant device according to the present invention will be explained below. In Fig. 4 showing the arrangement of the embodiment of the present invention, reference numeral 10 represents a surface illuminant device using a light transmitter such as that shown in FIG. 1. The liquid crystal display panel 5 includes a liquid crystal cell 5a and polarizing plates 5b and 5c, the orientations of the planes of polarization of which are indicated by arrows.

In this embodiment, as shown in the figure, the prism sheet 7 disposed ahead in the surface illuminant device is situated so that the longitudinal direction of each prism coincides with the orientation (the direction of the arrow) of the plane of polarization of the polarizing plate 5b.

This arrangement brings about a bright surface illuminant because the diffused light from the surface illuminant device is directed perpendicular to the entire surface of the prism sheet, and therefore the surface of the liquid crystal display panel 5, through the prism sheet 7. Furthermore, since the longitudinal direction of each prism is parallel to the plane of polarization of the polarizing plate 5b, the light is held bright without being affected by the prism sheet and the polarizing plates.

Figure 1:
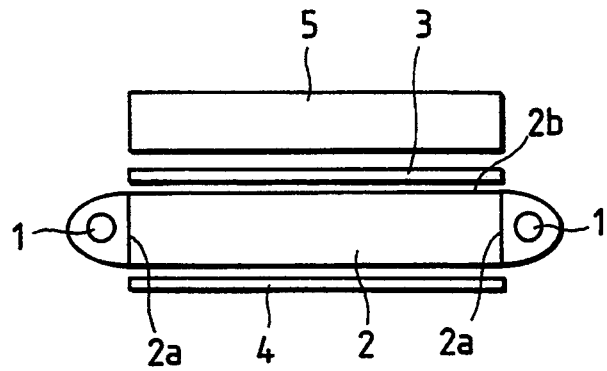
FIG. 1 is a sectional view showing a conventional surface illuminant device using a light transmitter.
Figure 2:
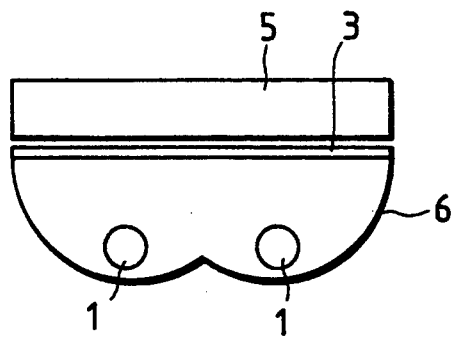
FIG. 2 is a sectional view showing another conventional surface illuminant device using a reflecting member.
Figure 3:
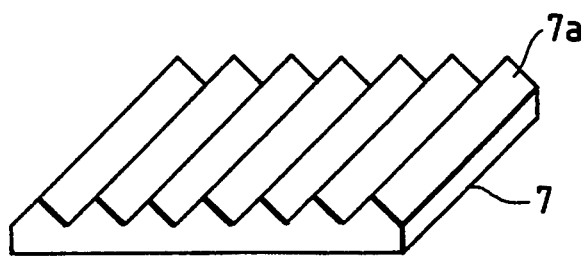
FIG. 3 is a perspective view showing a prism sheet.

Even though the longitudinal direction of each prism of the prism sheet 7 is not exactly parallel to the plane of polarization of the polarizing plate 5b, satisfactory brightness can be maintained. It is only necessary that an angle made by the longitudinal direction of each prism with the plane of polarization of the polarizing plate 5b is in the range of $-10°$ to $+10°$. Although the surface illuminant device of the embodiment employs the light transmitter as shown in FIG. 1, it may well employ the reflecting member as shown in FIG. 2. Any surface illuminant device may be used providing it emits diffused light.

What is claimed is:

1. A surface illuminant device for illuminating a liquid crystal display panel by diffused ,light produced through a diffusing plate disposed on a front of an illuminant section,
    wherein a prism sheet having a plurality of elongated prisms of triangular cross section is disposed on an exit side of said diffusing plate, said prism sheet being situated so that a longitudinal direction of each of the prisms is substantially parallel to a plane of polarization of a polarizing plate placed on a side of said prism sheet closet to the liquid crystal display panel.

* * * * *